(12) United States Patent
Sugihara et al.

(10) Patent No.: US 9,921,410 B2
(45) Date of Patent: Mar. 20, 2018

(54) HEAD-MOUNTED DISPLAY DEVICE

(71) Applicant: OLYMPUS CORPORATION, Tokyo (JP)

(72) Inventors: Ryohei Sugihara, Tokyo (JP); Seiji Tatsuta, Tokyo (JP); Teruo Tomita, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 145 days.

(21) Appl. No.: 14/752,017

(22) Filed: Jun. 26, 2015

(65) Prior Publication Data

US 2015/0293361 A1 Oct. 15, 2015

Related U.S. Application Data

(63) Continuation of application No. PCT/JP2013/007479, filed on Dec. 19, 2013.

(30) Foreign Application Priority Data

Dec. 28, 2012 (JP) ................................. 2012-288181

(51) Int. Cl.
*G02B 27/14* (2006.01)
*G02B 27/01* (2006.01)
*G02B 25/00* (2006.01)

(52) U.S. Cl.
CPC ....... *G02B 27/0172* (2013.01); *G02B 25/001* (2013.01); *G02B 27/0176* (2013.01);
(Continued)

(58) Field of Classification Search
CPC ............ G02B 27/0172; G02B 27/0101; G02B 2027/011; G02B 2027/0178; G02B 2027/0132

USPC ......................................... 359/630, 631, 632
See application file for complete search history.

(56) References Cited

U.S. PATENT DOCUMENTS

2002/0135830 A1* 9/2002 Endo .................. G02B 27/0172
359/15
2004/0174605 A1* 9/2004 Olsson ............... A61B 1/00048
359/630

(Continued)

FOREIGN PATENT DOCUMENTS

JP 2002-277815 A 9/2002
JP 2003-015075 A 1/2003

(Continued)

OTHER PUBLICATIONS

Chinese Office Action dated Dec. 19, 2016 in related Chinese Patent Application No. 201380067974.5.

(Continued)

*Primary Examiner* — James Greece
(74) *Attorney, Agent, or Firm* — Scully, Scott, Murphy & Presser, P.C.

(57) ABSTRACT

A head-mounted display device includes an eyeglass frame, including a rim, for fixing the head-mounted display device onto a wearer's head, a display that displays an image, and an eyepiece optical unit that guides light of an image displayed on the display into at least one of the wearer's eyes to display the image as an enlarged virtual image. The display and the eyepiece optical unit are attached to the rim, an optical axis of incident light that is image light incident on the eyepiece optical unit from the display and an optical axis of exiting light that is image light exiting from the eyepiece optical unit towards the wearer's eye are not coplanar, and the angle between an incident light vector formed by the incident light and an exiting light vector formed by the exiting light is greater than 90°.

11 Claims, 4 Drawing Sheets

(52) U.S. Cl.
CPC ........... *G02B 2027/0123* (2013.01); *G02B 2027/0161* (2013.01); *G02B 2027/0178* (2013.01)

(56) References Cited

U.S. PATENT DOCUMENTS

| | | | | |
|---|---|---|---|---|
| 2006/0164730 | A1* | 7/2006 | Holler | G02C 9/00 |
| | | | | 359/630 |
| 2010/0245755 | A1* | 9/2010 | Sugihara | G02B 27/0172 |
| | | | | 351/158 |
| 2011/0012814 | A1* | 1/2011 | Tanaka | G02B 27/0176 |
| | | | | 345/8 |
| 2012/0194419 | A1* | 8/2012 | Osterhout | G02B 27/0093 |
| | | | | 345/156 |

FOREIGN PATENT DOCUMENTS

| | | |
|---|---|---|
| JP | 2003-046903 A | 2/2003 |
| JP | 2005-500728 A | 1/2005 |
| JP | 2008-244658 A | 10/2008 |
| JP | 2010-226661 A | 10/2010 |
| JP | 2012-058301 A | 3/2012 |
| JP | 2012-063633 A | 3/2012 |

OTHER PUBLICATIONS

International Search Report dated Jan. 28, 2014 issued in PCT/JP2013/007479.
English Abstract of DE 10132872 A1, dated Jan. 16, 2003.
Japanese Office Action dated May 9, 2017 in Japanese Patent Application No. 2014-554128.

\* cited by examiner

Units : mm

HEAD-MOUNTED DISPLAY DEVICE

CROSS-REFERENCE TO RELATED APPLICATION

The present application is a Continuing Application based on International Application PCT/JP2013/007479 filed on Dec. 19, 2013, which in turn claims priority to Japanese Patent Application No. 2012-288181 filed on Dec. 28, 2012, the entire disclosure of which is incorporated herein by reference.

TECHNICAL FIELD

This disclosure relates to a head-mounted display device.

BACKGROUND

Various proposals have been made of head-mounted display devices, worn on a person's head, that include a display unit and an eyepiece optical unit. An image displayed on the display unit can be observed with the eyepiece optical unit as an enlarged virtual image. Since individuals wear such head-mounted display devices, there is a desire to be able to perform eyepoint adjustment and diopter adjustment in accordance with the individual wearer's pupillary distance, head size, eyesight, and the like.

In light of such demand, for example the applicant has proposed a head-mounted display device that includes a first housing that has a display unit, a second housing that allows for adjustment of the optical path length, and a third housing that has an eyepiece optical unit. The second housing is slidable towards the front and back of the wearer with respect to the first housing, and the third housing is slidable towards the left and right of the wearer with respect to the second housing (see JP 2012-63633 A (PTL 1)). The device disclosed in PTL 1 allows for eyepoint adjustment and diopter adjustment with a simple operation by sliding the second housing towards the front and back of the wearer with respect to the first housing and sliding the third housing towards the left and right of the wearer with respect to the second housing.

CITATION LIST

Patent Literature

PTL 1: JP 2012-63633 A

SUMMARY

After careful study, we discovered that such a head-mounted display device can be achieved by positioning an incident optical axis of image light incident on the eyepiece optical unit from the display unit and an exit optical axis of image light exiting from the eyepiece optical unit towards the wearer's eye to be twisted with respect to each other, so as not to be coplanar, and by having the incident optical axis and the exit optical axis form an acute angle, i.e. by having the incident light vector and the exiting light vector form an obtuse angle.

This disclosure is based on the aforementioned discovery, and we provide a head-mounted display device including: an eyeglass frame, including a rim, for fixing onto a wearer's head; a display configured to display an image; and an eyepiece optical unit configured to guide light of an image displayed on the display into at least one of the wearer's eyes to display the image as an enlarged virtual image, wherein the display and the eyepiece optical unit are attached to the rim, and an optical axis of incident light that is image light incident on the eyepiece optical unit from the display and an optical axis of exiting light that is image light exiting from the eyepiece optical unit towards the wearer's eye are not coplanar, and an angle between an incident light vector formed by the incident light and an exiting light vector formed by the exiting light is greater than 90°.

In this disclosure, stating that "an angle between an incident light vector formed by the incident light and an exiting light vector formed by the exiting light is greater than 90°" means that the return angle $\alpha$ when incident light is reflected back and exits as exiting light is less than 90°.

In our head-mounted display device, the angle between the incident light vector formed by the incident light and the exiting light vector formed by the exiting light may be 95° or greater and 120° or less.

In our head-mounted display device, the eyepiece optical unit may include a first reflecting surface that deflects the image light from the display in a forward direction with respect to the wearer; a second reflecting surface that deflects image light from the first reflecting surface in a downward direction with respect to the wearer; and a third reflecting surface that deflects image light from the second reflecting surface toward the wearer's eye.

In our head-mounted display device, an exit optical axis of image light reflected by the third reflecting surface may be inclined with respect to an image optical axis of image light reflected by the first reflecting surface.

In our head-mounted display device, the rim may include at least one slide guide, the display and the eyepiece optical unit may be attached to the at least one slide guide, and the optical axis of incident light and a slide direction of the at least one slide guide may be parallel.

In our head-mounted display device, the display and the eyepiece optical unit may be slidable independently of each other along the at least one slide guide.

In our head-mounted display device of claim, at least one of the display and the eyepiece optical unit may be detachable from the at least one slide guide.

In our head-mounted display device, the display may be shaped along an extending direction of an apex of the rim.

In our head-mounted display device, the eyepiece optical unit may include: a deflecting prism including the first reflecting surface; and an eyepiece prism including the second reflecting surface and the third reflecting surface.

In our head-mounted display device, an angle between an eyepiece prism incident light vector formed by eyepiece prism incident light that is image light incident on the eyepiece prism from the deflecting prism and an eyepiece prism exiting light vector formed by eyepiece prism exiting light that is image light exiting from the eyepiece prism towards the wearer's eye may be 165° or greater.

DETAILED DESCRIPTION

The following describes embodiments in detail with reference to the drawings. Note that the drawings referred to below are not always to scale. Furthermore, the terms front, back, left, right, up, down, and the like refer to the respective directions as seen from the wearer when the head-mounted display device is mounted (worn) on the head.

Depending on usage conditions of the head-mounted display device, there may be a desire to sufficiently guarantee the field of view in the horizontal direction. In the device disclosed in PTL 1, however, the first housing that extends along the temple of a pair of eyeglasses and the third housing that includes the eyepiece optical unit and is positioned in front of the wearer's eye are connected via the second housing, so that a portion of these housings is sometimes positioned in the wearer's horizontal field of view.

It could therefore be helpful to provide a head-mounted display device that guarantees the wearer's horizontal field of view.

Figure 1:
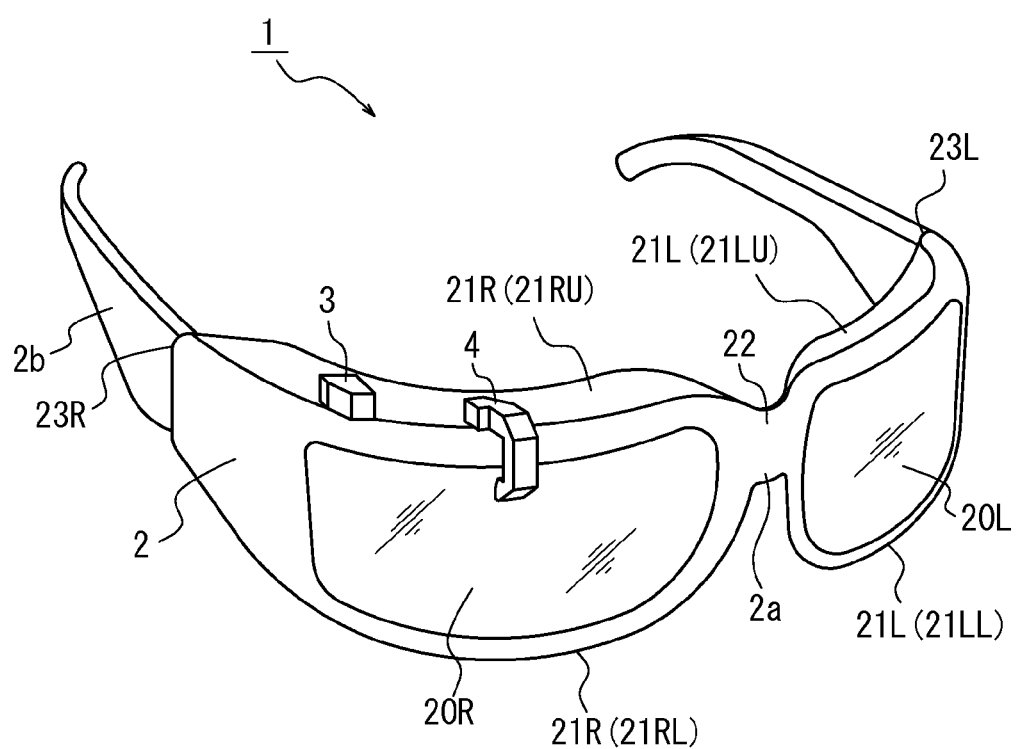
FIG. 1 is a perspective view illustrating a head-mounted display device according to an embodiment.

FIG. 1 is a perspective view illustrating a head-mounted display device according to an embodiment.

As illustrated in FIG. 1, the head-mounted display device 1 of the present embodiment includes an eyeglass frame 2 for fixing the head-mounted display device 1 onto the wearer's head, a display unit (display) 3 that displays an image, and an eyepiece optical unit 4 that guides light of an image displayed on the display unit 3 into at least one of the wearer's eyes to display the image as an enlarged virtual image. The eyeglass frame 2 includes a front 2a and a temple 2b.

As also illustrated in FIG. 1, the front 2a of the eyeglass frame 2 includes two rim portions 21L and 21R respectively for mounting left and right lenses 20L and 20R. The left-eye rim portion 21L and the right-eye rim portion 21R are connected by a bridge 22. Furthermore, in the illustrated example, the rim portions 21L and 21R are respectively formed by upper rim portions 21LU and 21RU and lower rim portions 21LL and 21RL. As illustrated in FIG. 1, the front 2a includes end pieces 23L and 23R and is connected to the temple 2b via the end pieces 23L and 23R. The lenses 20L and 20R may be attached in the rim portions 21L and 21R, yet the eyeglass frame 2 need not include lenses.

In the example in FIG. 1, the display unit 3 and the eyepiece optical unit 4 are attached to the upper rim portion 21R at the right-eye side (in the illustrated example, the apex of the upper rim portion 21R is the attachment location). The display unit 3 and the eyepiece optical unit 4 may, however, be attached to the upper rim portion 21L at the left-eye side.

The display unit 3 may, for example, include a compact image display element such as a liquid crystal display panel, an organic EL display, or the like.

The following describes the eyepiece optical unit 4 in greater detail.

Figure 2A:
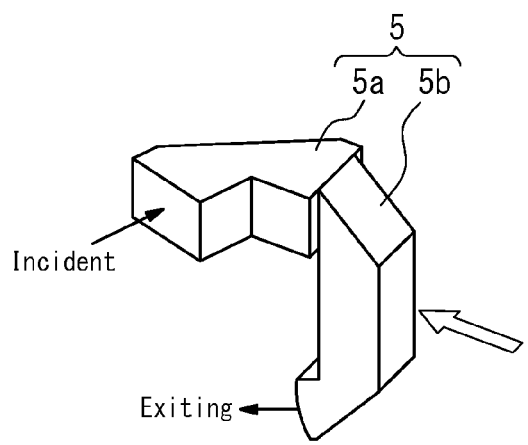
FIGS. 2A through 2D illustrate the prisms used in the eyepiece optical unit.
Figure 2B:
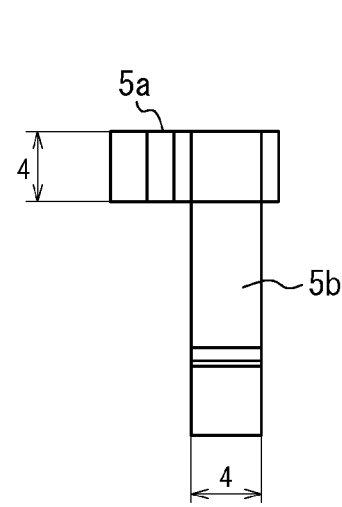

FIG. 2A is a perspective view illustrating a prism 5 used in the eyepiece optical unit 4, and FIG. 2B is a plan view of the prism 5 used in the eyepiece optical unit 4 as seen from the direction of the arrow in FIG. 2A.

In the example in FIGS. 2A and 2B, the prism 5 is a combination of a deflecting prism 5a that receives the image light exiting from the display unit 3 and emits the image light in a forward direction with respect to the wearer and an eyepiece prism 5b that receives the image light exiting from the deflecting prism 5a and reflects the image light towards toward the wearer's eye. These prisms are, for example, held in the same housing.

While the dimensions are not limited, in this example, in the plan view illustrated in FIG. 2B, the height of the deflecting prism 5a is approximately 4 mm, and the width of the eyepiece prism 5b is approximately 4 mm.

Figure 2C:
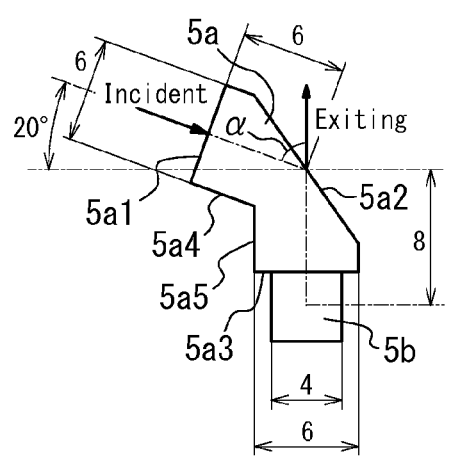

FIG. 2C is a plan view of a portion of the deflecting prism 5a and the eyepiece prism 5b. As illustrated in FIGS. 2A to 2C, the deflecting prism 5a includes a transmitting surface 5a1 on which image light exiting from the display unit 3 is incident, a reflecting surface 5a2 that deflects the incident image light, and a transmitting surface 5a3 that emits the deflected image light towards the eyepiece prism 5b. As illustrated, the deflecting prism 5a includes two surfaces 5a4 and 5a5, respectively in directions along the optical paths of the incident light and exiting light, that are not reflecting surfaces for the image light. These surfaces are connected to form a bend (so that the interior angle is an obtuse angle). In the illustrated example, the surfaces 5a4 and 5a5 are formed as light-absorbing surfaces that absorb unnecessary light, such as stray light, ghost light, or the like, and may, for example, be formed by applying sand-surface treatment and painting the surfaces black.

The deflection angle of the deflecting prism 5a is 90° or less (70° in the illustrated example).

As illustrated in FIG. 2C, surface treatment is applied to the ridge portion between the transmitting surface 5a1 and the reflecting surface 5a2, and similar surface treatment is also applied to the ridge portion between the reflecting surface 5a2 and the transmitting surface 5a3. The reason is that light beams of the image light exiting from the display unit 3 do not reach these ridge portions. For example, pebbling, chamfering, coating with ink, or a combination thereof may be applied as this surface treatment. Applying the above surface treatment allows for removal of unnecessary light, such as stray light, ghost light, or the like.

With the deflecting prism 5a illustrated in FIG. 2C, the optical axis of image light incident from the display unit 3 is bent once by the reflecting surface 5a2 to be deflected in a forward direction with respect to the wearer.

The dimensions of the deflecting prism 5a are not limited, yet in this example, in the plan view illustrated in FIG. 2C, the length of the transmitting surface 5a1 and the transmitting surface 5a3 is 6 mm, the distance until the optical axis of the image light exiting from the display unit 3 reaches the reflecting surface 5a2 is 6 mm, the distance until the optical axis of the image light reflected by the reflecting surface 5a2 reaches the transmitting surface 5a3 is 6 mm, and as described above, the width of the eyepiece prism 5b is 4 mm.

The display unit 3 may also include a protective window (or a type of filter) and may cause the image light emitted from the display element to pass through the protective window before being incident on the deflecting prism 5a.

Figure 2D:
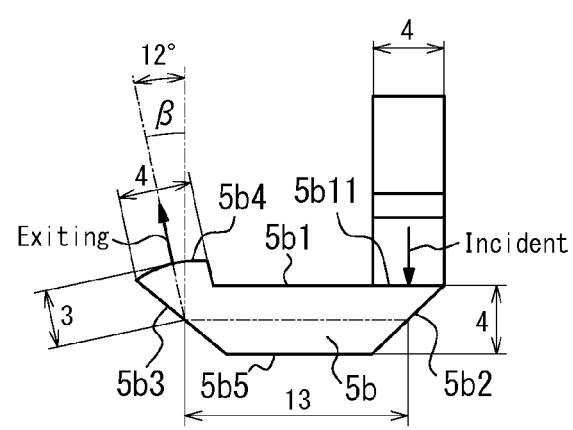

FIG. 2D is a plan view of a portion of the eyepiece prism 5b and the deflecting prism 5a. As illustrated in FIGS. 2A, 2B, and 2D, the eyepiece prism 5b includes a surface 5b1, which includes a transmitting surface 5b11 on which image light from the deflecting prism 5a is incident, a reflecting surface 5b2 that deflects the incident image light in a downward direction with respect to the wearer when the glasses frame 2 is being worn, a reflecting surface 5b3 that deflects the incident image light toward the wearer's eye, and a transmitting surface 5b4 from which the image light reflected by the reflecting surface 5b3 exits towards the wearer's eye. The surface 5b1 (the portion excluding the transmitting surface 5b11) is not a reflecting surface for the image light, and the eyepiece prism 5b also includes a surface 5b5, opposite the surface 5b11, that is not a reflecting surface for the image light. The surfaces 5b1 and 5b5 are formed as light-absorbing surfaces that absorb ghost light and may, for example, be formed by applying sand-surface treatment and painting the surfaces black. The image light may be guided by being reflected by at least one of the surfaces 5b1 and 5b5. In this case, the surfaces 5b1 and 5b5 are formed as reflecting surfaces.

According to the eyepiece prism 5b illustrated in FIG. 2D, the optical axis of the image light exiting from the deflecting prism 5a and incident on the eyepiece prism 5b is bent twice, by the reflecting surfaces 5b2 and 5b3, to be directed towards the wearer's eye. Specifically, the optical axis of the image light exiting from the deflecting prism 5a and incident on the eyepiece prism 5b is bent downwards from above by the reflecting surface 5b2 and then is subsequently bent backwards, away from the forwards direction, towards the wearer's eye by the reflecting surface 5b3.

The dimensions of the eyepiece prism 5b are not limited, yet in this example, in the plan view in FIG. 2D, the width of the reflecting surface 5b1 is 4 mm, the distance until the optical axis of the image light reflected by the reflecting surface 5b2 reaches the reflecting surface 5b3 is 13 mm, the distance until the optical axis of the image light reflected by the reflecting surface 5a3 reaches the transmitting surface 5b4 is 3 mm, and the width of the transmitting surface 5b4 is 4 mm.

In the illustrated example, the transmitting surface 5b4 of the eyepiece prism 5b is convex in the direction in which the image light exits and has a positive optical power.

Also, in the illustrated example, the angle between an eyepiece prism incident light vector formed by eyepiece prism incident light that is image light incident on the eyepiece prism 5b from the deflecting prism 5a and an eyepiece prism exiting light vector formed by eyepiece prism exiting light that is image light exiting from the eyepiece prism 5b towards the wearer's eye is 168°. In other words, as illustrated in FIG. 2D, the return angle β of the eyepiece prism incident light that is reflected back and exits as eyepiece prism exiting light is 12°. Considering the range of motion of a person's line of sight, the angle between the eyepiece prism incident light vector and the eyepiece prism exiting light vector is thus preferably 165° or greater and 175° or less (i.e. the angle β is preferably 5° or greater and 15° or less).

According to the prism 5, the plane that includes the optical axis traversing the deflecting prism 5a and the plane including the optical axis traversing the eyepiece prism 5b are not the same plane, but rather are different planes.

The prism illustrated in FIGS. 2A to 2D is a combination of the deflecting prism 5a and the eyepiece prism 5b, which are separate components, yet an integrally formed prism may also be used.

According to the head-mounted display device 1 illustrated in FIG. 1, which is provided with the eyepiece optical unit 4 that includes the prism 5, the optical axis of incident light that is image light incident on the eyepiece optical unit 4 from the display unit 3 and the optical axis of exiting light that is image light exiting from the eyepiece optical unit 4 towards the wearer's eye are positioned to be twisted with respect to each other, so as not to be coplanar (so as to lie in different planes). Furthermore, the angle between the incident light vector formed by the incident light and the exiting light vector formed by the exiting light is greater than 90° (i.e. as illustrated in FIG. 2C, the angle α is smaller than 90°).

The following describes the effects of the head-mounted display device according to the present embodiment.

According to the head-mounted display device 1 of the present embodiment, to begin with, the display unit 3 and the eyepiece optical unit 4 are not attached to the temple 2b of the eyeglass frame 2, but rather to the upper rim portion 21. Therefore, the wearer's horizontal field of view can be guaranteed. Since the display unit 3 and the eyepiece optical unit 4 are both attached to the upper rim portion 21 (to the same location), the head-mounted display device 1 can be made compact and lightweight, thus ensuring the design.

Furthermore, according to the head-mounted display device 1 of the present embodiment, the incident optical axis of image light incident on the eyepiece optical unit 4 from the display unit 3 and the exit optical axis of image light exiting from the eyepiece optical unit 4 towards the wearer's eye are not coplanar, and the angle between the incident light vector formed by the incident light and the exiting light vector formed by the exiting light is greater than 90°. Therefore, the image light from the display unit 3 attached to the upper rim portion 21 of the eyeglass frame 2 can, while following the shape of the eyeglass frame 2, be emitted towards the wearer's eye from near the front of the wearer. Accordingly, the wearer can observe the image displayed on the display unit 3 with the eyepiece optical unit 4 as an enlarged virtual image.

The angle between the incident light vector formed by the incident light and the exiting light vector formed by the exiting light is preferably 95° or greater and 120° or less.

The reason is that by setting the angle within the above range, the above effects can be achieved in a variety of shapes of eyeglasses, including eyeglass frames with a curved shape such as sunglasses.

Next, another structure of the head-mounted display device for performing eyepoint adjustment and diopter adjustment is described.

Figure 3A:
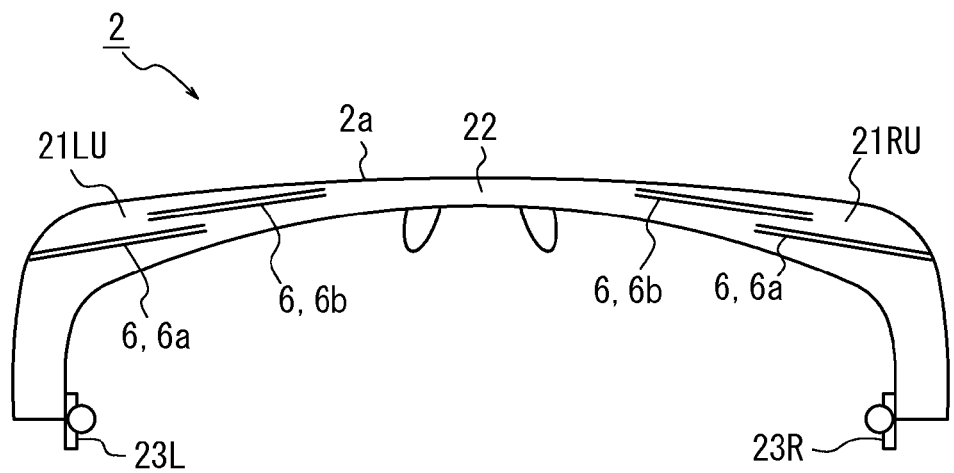
FIG. 3A is a top view of an eyeglass frame in a head-mounted display device according to another embodiment.
Figure 3B:
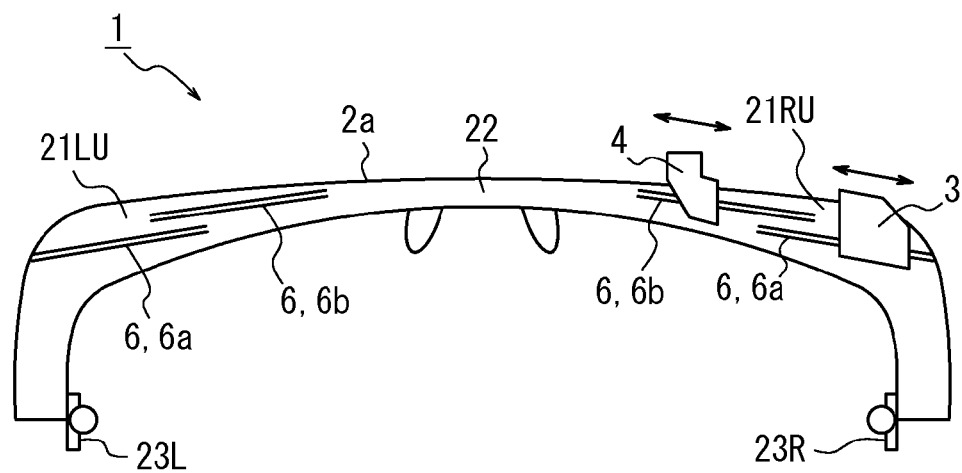
FIG. 3B is a top view of the head-mounted display device according to the other embodiment, illustrating the display unit and the eyepiece optical unit attached to the eyeglass frame in FIG. 3A.

FIG. 3A is a top view of an eyeglass frame 2 in a head-mounted display device 1 according to another embodiment, and FIG. 3B is a top view of the head-mounted display device 1 according to the other embodiment, illustrating a display unit 3 and an eyepiece optical unit 4 attached to the eyeglass frame 2 in FIG. 3A.

The head-mounted display device 1 according to the present embodiment differs from the above-described embodiment illustrated in FIG. 1 in that in the eyeglass frame 2, at least one slide guide 6 is provided on upper rim portions 21L and 21R.

First, the eyeglass frame 2 that is a structural element of the head-mounted display device 1 according to the present embodiment is described. As illustrated in FIG. 3A, the eyeglass frame 2 includes at least one slide guide 6 on upper rim portions 21LU and 21RU. In the illustrated example, the upper rim portion 21RU includes a display unit slide 6a to which the display unit 3, which displays an image, can be slidably attached and an eyepiece optical unit slide 6b to which the eyepiece optical unit 4, which guides light of the image displayed on the display unit 3 into at least one of the wearer's eyes to display the image as an enlarged virtual image, can be slidably attached.

In the illustrated example, the display unit slide 6a and the eyepiece optical unit slide 6b are linear.

In the present embodiment, the slide guide 6 is formed by providing guide grooves on the upper rim portions 21LU and 21RU, and the display unit 3 and eyepiece optical unit 4 are engaged with these guide grooves, yet this example is not limiting. The slide guide 6 may be formed by any known method.

As illustrated in FIG. 3B, in the head-mounted display device 1 according to the present embodiment, the display unit 3 and the eyepiece optical unit 4 are attached to the at least one slide guide 6. In the illustrated example, the display unit 3 is attached to the display unit slide 6a at the right-eye side, and the eyepiece optical unit 4 is attached to the eyepiece optical unit slide 6b at the right-eye side.

The incident optical axis of image light incident on the eyepiece optical unit 4 from the display unit 3 is parallel to the slide direction of the at least one slide guide 6 (the display unit slide 6a and the eyepiece optical unit slide 6b in the illustrated example).

In this example, the display unit slide 6a and the eyepiece optical unit slide 6b are provided not only on the upper rim portion 21RU at the right-eye side, where the display unit 3 and the eyepiece optical unit 4 are attached, but also on the upper rim portion 21LU at the left-eye side, where the display unit 3 and the eyepiece optical unit 4 are not attached.

According to the structure of present embodiment, the eyepiece optical unit 4 attached to the eyepiece optical unit slide 6b can be slid in parallel with the incident optical axis, thereby allowing for eyepoint adjustment in accordance with the wearer's pupillary distance, head size, and the like.

Furthermore, as illustrated in FIGS. 3A and 3B, the display unit 3 and the eyepiece optical unit 4 are preferably slidable independently of each other along the at least one slide guide 6 (along each of the display unit slide 6a and the eyepiece optical unit slide 6b in the illustrated example).

With this structure, sliding the display unit 3 to adjust the relative distance between the display unit 3 and the eyepiece optical unit 4 both allows for the display image to be displayed at an image distance that matches the wearer's eyesight and allows for diopter adjustment.

At this time, since the display unit slide 6a on which the display unit 3 is slid and the eyepiece optical unit slide 6b on which the eyepiece optical unit 4 is slid are both parallel to the incident optical axis, the incident optical axis is not misaligned upon adjusting the relative distance between the display unit 3 and the eyepiece optical unit 4.

In the embodiment illustrated in FIGS. 3A and 3B, at least one of the display unit 3 and the eyepiece optical unit 4 is preferably detachable from the at least one slide guide 6. For example, a structure such that the display unit 3 is detachable from an edge of the display unit slide 6a and the eyepiece optical unit 4 is detachable from an edge of the eyepiece optical unit slide 6b may be adopted.

Making the display unit 3 detachable from the display unit slide 6a allows for replacement with another display unit having a different display size. Since the display unit 3 is slidable along the display unit slide 6a, in this case as well diopter adjustment can be performed in accordance with the display size of the display unit 3 after replacement.

Making the eyepiece optical unit 4 detachable from the eyepiece optical unit slide 6b allows for replacement with an eyepiece optical unit 4 having different specifications (for example, different specifications such as focal distance, optical path length, magnifying power, and the like), allowing for observation of the display image from a different angle of view. In this case as well, sliding the display unit 3 along the display unit slide 6a to adjust the relative distance between the display unit 3 and the eyepiece optical unit 4 allows for diopter adjustment.

Figure 4:
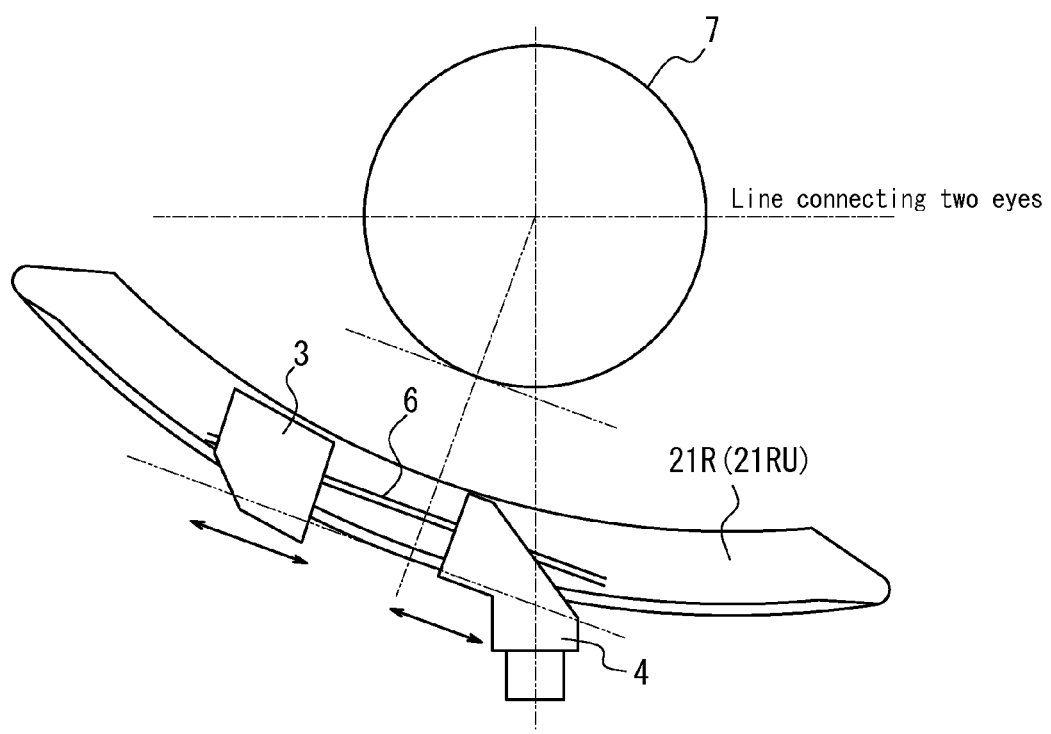
FIG. 4 is a partial top view illustrating a section of a head-mounted display device according to another embodiment.

FIG. 4 is a partial top view illustrating a section of a head-mounted display device according to another embodiment.

The head-mounted display device illustrated in FIG. 4 differs from the head-mounted display device according to the embodiment illustrated in FIGS. 3A and 3B by being provided with only one slide guide 6, to which the display unit 3 and the eyepiece optical unit 4 are slidably attached.

In other words, in the example illustrated in FIG. 4, the display unit slide and the eyepiece optical unit slide are integrated so as to be connected along a straight line, thereby forming one slide guide 6.

In this case as well, the slide directions of the display unit 3 and the eyepiece optical unit 4, which are slidable along the slide guide unit 6, are both parallel to the incident optical axis of image light incident from the display unit 3.

Accordingly, as with the embodiment illustrated in FIGS. 3A and 3B, eyepoint adjustment and diopter adjustment are possible with the head-mounted display device of the embodiment illustrated in FIG. 4.

In the head-mounted display device of the embodiments illustrated in FIGS. 1, 3A, 3B, and 4, the inclination angle of the slide direction of the display unit slide 6a and the eyepiece optical unit slide 6b with respect to a line connecting the wearer's two eyes is preferably from 10° to 30°. Note that the inclination angle is defined as an acute angle.

The reason is that inclining the slide direction at the above angles allows for sliding in a straight line trajectory along a variety of shapes of eyeglasses, including eyeglass frames with a curved shape such as sunglasses.

In our head-mounted display device, the display unit 3 is preferably shaped along the extending direction of the apex of the upper rim portions 21R and 21L.

By shaping the display unit 3 to conform to the shape of the eyeglass frame 2, the wearer's field of view can be further guaranteed.

While embodiments have been described, the present disclosure is not limited in any way to the above embodiments. For example, the case of a head-mounted display device for the right eye has been described, yet our head-mounted display device is not limited to the right eye and may be structured similarly for the left eye. Alternatively, a structure for both eyes may be adopted.

Furthermore, for example when providing a slide guide in the upper rim portion, it is possible to provide the slide guide on only one of the left and right sides or on both sides. When providing the slide guide on both the left and right sides of the upper rim portion, the display unit and the eyepiece optical unit may be attached slidably to either the left or right side in accordance with the wearer's preference, or display units and eyepiece optical units may be attached slidably to both the left and right sides.

To make the image a see-through image through which the background can be seen, the eyepiece optical unit may be made narrower than 4 mm, which is the human pupil diameter in a normal environment.

INDUSTRIAL APPLICABILITY

Our head-mounted display device guarantees the wearer's horizontal field of view and can be manufactured and provided to the market.

REFERENCE SIGNS LIST

1 Head-mounted display device
2 Eyeglass frame

3 Display unit (Display)
4 Eyepiece optical unit
5 Prism
5a Deflecting prism
5b Eyepiece prism
6 Slide guide
6a Display unit slide
6b Eyepiece optical unit slide
7 Eye

The invention claimed is:

1. A head-mounted display device comprising:
an eyeglass frame, including a rim, for fixing onto a wearer's head;
a display configured to display an image; and
an eyepiece optical unit configured to guide light of an image displayed on the display into at least one of the wearer's eyes to display the image as an enlarged virtual image, wherein
the display and the eyepiece optical unit are attached to the rim, and
an optical axis of incident light that is image light incident on the eyepiece optical unit from the display and an optical axis of exiting light that is image light exiting from the eyepiece optical unit towards the wearer's eye are not coplanar, and an angle between an incident light vector formed by the incident light and an exiting light vector formed by the exiting light is greater than 90°.

2. The head-mounted display device of claim 1, wherein the angle between the incident light vector formed by the incident light and the exiting light vector formed by the exiting light is 95° or greater and 120° or less.

3. The head-mounted display device of claim 1, wherein the eyepiece optical unit comprises:
a first reflecting surface that deflects the image light from the display in a forward direction with respect to the wearer;
a second reflecting surface that deflects image light from the first reflecting surface in a downward direction with respect to the wearer; and
a third reflecting surface that deflects image light from the second reflecting surface toward the wearer's eye.

4. The head-mounted display device of claim 3, wherein an exit optical axis of image light reflected by the third reflecting surface is inclined with respect to an image optical axis of image light reflected by the first reflecting surface.

5. The head-mounted display device of claim 1, wherein the rim comprises at least one slide guide,
the display and the eyepiece optical unit are attached to the at least one slide guide, and
the optical axis of incident light and a slide direction of the at least one slide guide are parallel.

6. The head-mounted display device of claim 5, wherein the display and the eyepiece optical unit are slidable independently of each other along the at least one slide guide.

7. The head-mounted display device of claim 5, wherein at least one of the display and the eyepiece optical unit is detachable from the at least one slide guide.

8. The head-mounted display device of claim 1, wherein the display is shaped along an extending direction of an apex of the rim.

9. The head-mounted display device of claim 3, wherein the eyepiece optical unit comprises:
a deflecting prism including the first reflecting surface; and
an eyepiece prism including the second reflecting surface and the third reflecting surface.

10. The head-mounted display device of claim 9, wherein an angle between an eyepiece prism incident light vector formed by eyepiece prism incident light that is image light incident on the eyepiece prism from the deflecting prism and an eyepiece prism exiting light vector formed by eyepiece prism exiting light that is image light exiting from the eyepiece prism towards the wearer's eye is 165° or greater.

11. A head-mounted display device comprising:
an eyeglass frame, including a rim, for fixing onto a wearer's head;
a display configured to display an image; and
an eyepiece optical unit configured to guide light of an image displayed on the display into at least one of the wearer's eyes to display the image as an enlarged virtual image, wherein
the display and the eyepiece optical unit are separate units positioned at different locations on the rim, and
an optical axis of incident light that is image light incident on the eyepiece optical unit from the display and an optical axis of exiting light that is image light exiting from the eyepiece optical unit towards the wearer's eye are not coplanar, and an angle between an incident light vector formed by the incident light and an exiting light vector formed by the exiting light is greater than 90°.

* * * * *